United States Patent [19]
Weber et al.

[11] Patent Number: 5,809,198
[45] Date of Patent: Sep. 15, 1998

[54] LOW REFLECTION OPTICAL FIBER TERMINATION DEVICE AND METHOD USING SAME

[75] Inventors: Pamela A. Weber, Baltimore; Zhongxuan Jiang, Laurel; Vincent J. Tekippe, Millersville, all of Md.

[73] Assignee: Gould Electronics Inc., Eastlake, Ohio

[21] Appl. No.: 865,133

[22] Filed: May 29, 1997

[51] Int. Cl.⁶ .................................................. G02B 6/00
[52] U.S. Cl. ........................ 385/139; 385/31; 385/33; 385/39; 385/76; 385/77; 385/35
[58] Field of Search ................... 385/31, 33, 35, 385/38, 39, 77, 78, 76, 85, 139

[56] References Cited

U.S. PATENT DOCUMENTS

| | | |
|---|---|---|
| 4,290,667 | 9/1981 | Chown .................................. 385/76 X |
| 4,755,203 | 7/1988 | Coutts .................................. 385/35 X |
| 4,998,795 | 3/1991 | Bowen et al. ...................... 385/139 X |
| 5,048,908 | 9/1991 | Blonder et al. ........................... 385/39 |
| 5,058,983 | 10/1991 | Corke et al. .............................. 385/78 |
| 5,263,103 | 11/1993 | Kosinski .................................. 385/31 |

*Primary Examiner*—Brian Healy
*Attorney, Agent, or Firm*—Mark Kusner; Michael A. Centanni

[57] ABSTRACT

A low reflection termination device comprised of a tubular glass housing having an interior cavity, an optical fiber having an end with a portion of the end being formed by the application of heat into a glass bead and extends into the glass housing with the glass bead positioned within the interior cavity, a clear cured epoxy disposed within the cavity of the housing surrounding the glass bead, and a light absorbing material which coats the tubular glass housing.

34 Claims, 4 Drawing Sheets

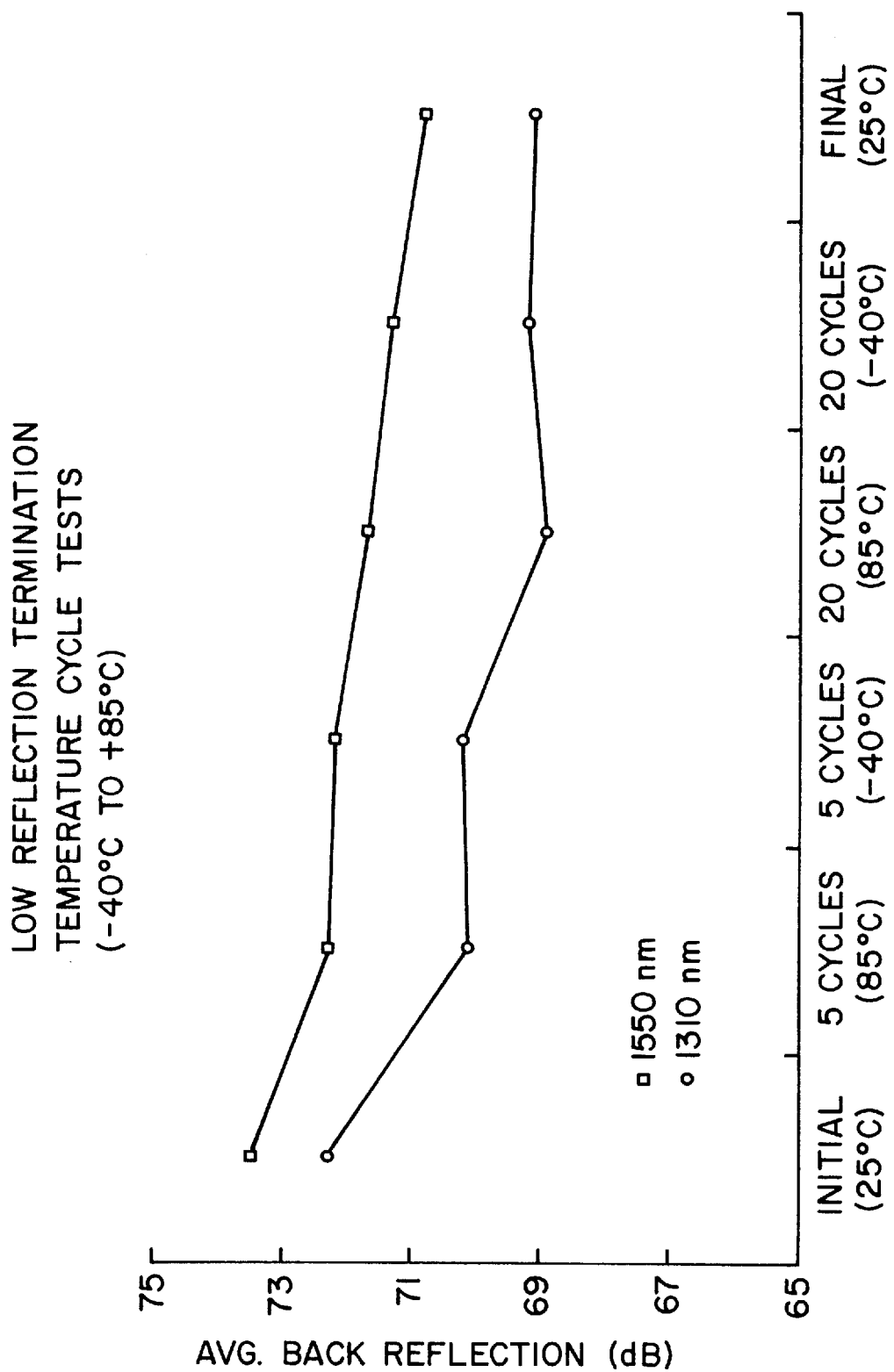

LOW REFLECTION OPTICAL FIBER TERMINATION DEVICE AND METHOD USING SAME

FIELD OF THE INVENTION

The present invention relates generally to fiber optic devices, and more particularly, to a termination device for the ends of optical fibers to minimize the deleterious reflection of light.

BACKGROUND OF THE INVENTION

Many fiber optic devices include optical fibers which are not used. In most cases, it is desirable to absorb light energy propagating down the unused fibers so that little light, if any, is reflected at the end of the fiber back into the optical device. Even for small light signals, such reflected light is undesirable in that it introduces "noise" into the light signal, thereby reducing the signal-to-noise ratio of the device.

The present invention provides a termination device for the ends of optical fibers, which device exceeds all existing standards relating to reflected light, and which device may be manufactured to a standard of reliability and performance, wherein testing of individual termination devices is not required.

SUMMARY OF THE INVENTION

In accordance with the present invention, there is provided a method for terminating an end of an optical fiber, comprising the steps of heating an end of an optical fiber to form a bead of glass thereon, encasing the end of the fiber in a light-transmitting material contained within the housing, the material having an index of refraction approximately equal to the index of refraction of the bead of glass, and coating the housing with a light absorbing material.

In accordance with another aspect of the present invention, there is provided a low reflection termination device comprised of a housing formed of a light transmitting material having a cavity therein and an optical fiber having an end thereof formed into a bead of glass by the application of heat. The optical fiber extends into the housing with the bead of glass positioned within the cavity. A light transmitting material within the cavity of the housing surrounds the bead of glass. A light absorbing material coats the housing.

In accordance with another aspect of the present invention, there is provided a method for terminating an end of an optical fiber comprising the steps of: heating an end of an optical fiber to form a glass bead thereon, inserting the end of the optical fiber into a glass tube filled with a clear, curable epoxy, curing the epoxy to fix the end of the optical fiber within the glass tube, and coating the glass tube with a light-absorbing material.

In accordance with another aspect of the present invention, there is provided a low reflection termination device for use on an end of an optical fiber. The device is comprised of a tubular glass housing having an inner cavity. The end of an optical fiber is formed into a glass bead by the application of heat. The end of the fiber extends into the glass housing with the glass bead positioned within the interior cavity of the housing. A cured epoxy is disposed within the cavity of the housing to surround the glass bead. A light-absorbing material coats the outer surface of the glass housing.

It is an object of the present invention to provide a low-reflection termination device for the end of an optical fiber.

Another object of the present invention is to provide a device as described above which exceeds all applicable industry standards for such devices.

A still further object of the present invention is to provide a device as described above which can be manufactured to predictable performance standards such that testing of individual devices is not required.

These and other objects and advantages will become apparent from the following description of a preferred embodiment of the present invention taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part thereof, and wherein:

FIG. 9 is a graph showing the average reflection in decibels (dB) at various temperatures of a number of termination devices formed according to the present invention for light wavelengths of 1310 nm and 1550 nm; and,

BRIEF DESCRIPTION OF PREFERRED EMBODIMENT

Figure 1:
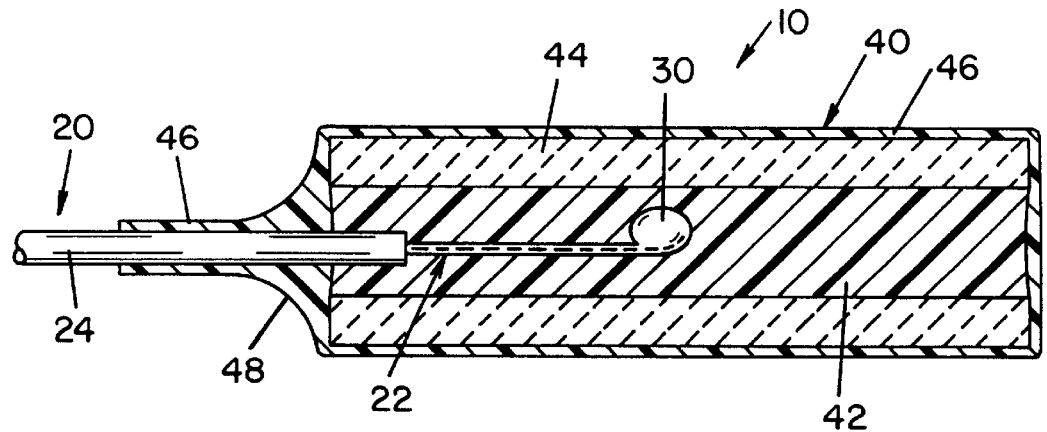
FIG. 1 is an enlarged, sectional view of a termination device for the end of an optical fiber illustrating a preferred embodiment of the present invention.

Referring now to the drawings wherein the showings are for the purpose of illustrating a preferred embodiment of the invention only, and not for the purpose of limiting same, FIG. 1 shows a cross-sectional view of a termination device 10 in accordance with the present invention. Termination device 10 is for use in terminating the end of an optical fiber, designated 20 in the drawings. Optical fiber 20 is generally comprised of an inner glass fiber 22 having an outer protective sheath 24. Glass fiber 22, as described hereinafter, shall mean the glass core 26 and the glass cladding 28 of a conventional optical fiber.

In accordance with the present invention, a portion of the protective sheath 24 is removed from the end of optical fiber 20, and the free end of glass fiber 22 is formed into a generally spherical glass bead or ball 30. A preferred method of removing sheath 24 and forming glass bead 30 shall be discussed below. The exposed glass fiber 22 and glass bead 30 are enclosed within a protective structure, designated 40 in the drawings. Structure 40 is provided foremost to protect the free end of glass fiber 22, specifically glass bead 30, but is also designed to absorb or transmit light exiting glass bead 30. Stated another way, structure 40 is provided to protect glass bead 30 and to prevent light emanating from glass bead 30 from being reflected back into glass bead 30. To this end, structure 40 may be comprised of light transmitting components and materials to convey light emanating from glass bead 30 away therefrom, or may be comprised of light absorbing components and materials to absorb light emanating from glass bead 30, or may be comprised of a combination of light transmitting and light absorbing components and materials, i.e., non-reflective materials.

In accordance with a preferred embodiment of the present invention, protective structure 40 is comprised of a material 42 contained within a housing 44, that in turn is encased within a material 46. Specifically, in the embodiment shown in FIGS. 1 and 2, the exposed glass fiber 22 and glass bead 30 are surrounded by a light transmitting material 42. The end of optical fiber 20 and light transmitting material 42 are contained within the cavity defined by housing 44 formed of a rigid, light transmitting material. A light-absorbing coating 46 encases housing 44 and a portion of optical fiber 20.

Figure 3:
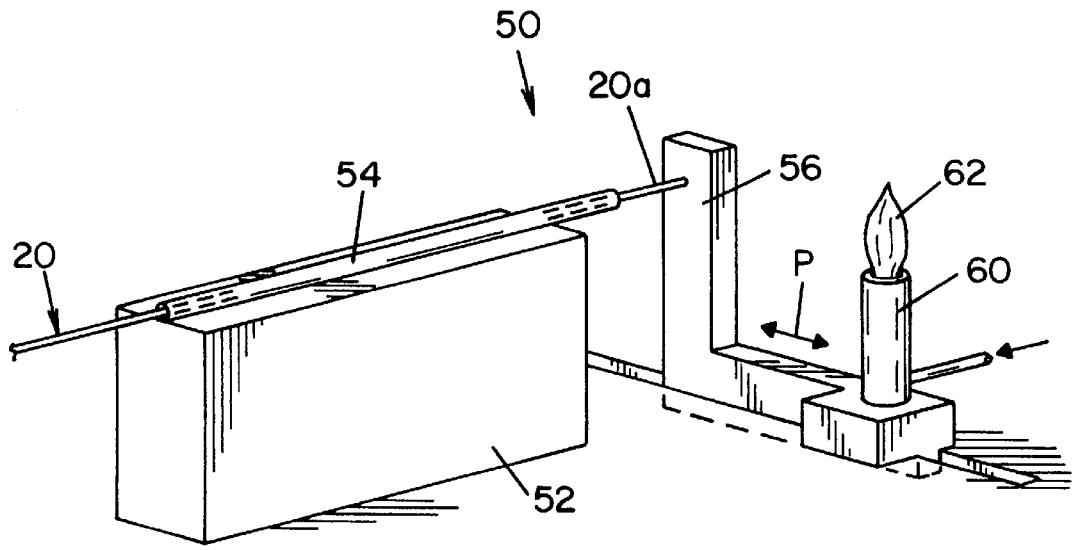
FIG. 3 is a schematic view of a device for forming a bead of glass at the end of an optical fiber in accordance with the present invention.
Figure 4:
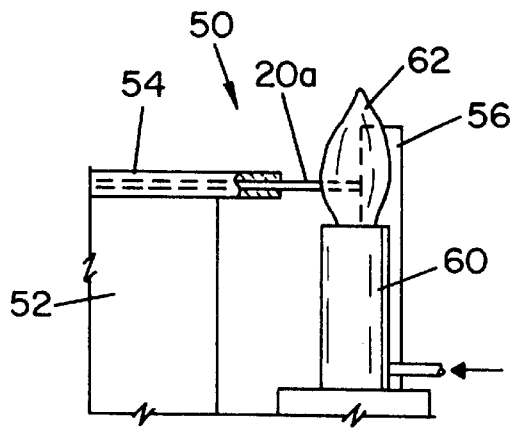
FIGS. 4–7 show the steps of forming the glass bead at the end of an optical fiber in accordance with the present invention.
Figure 5:
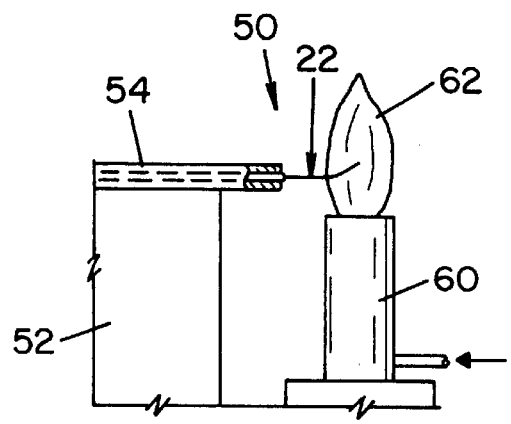
Figure 6:
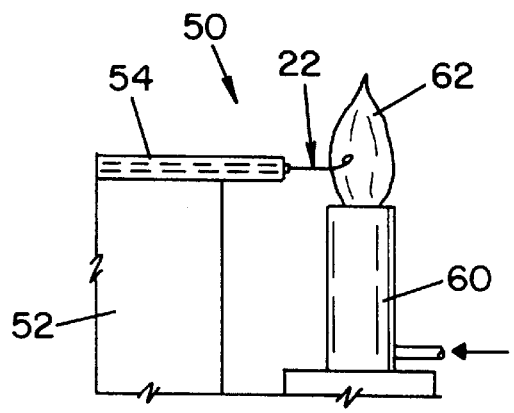
Figure 7:
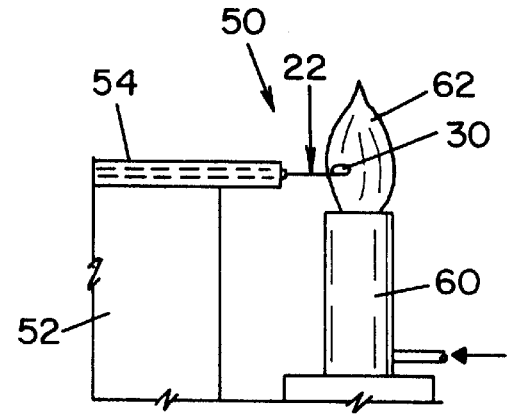

Referring more specifically to termination device 10, glass bead 30 at the end of optical fiber 20 is formed by applying heat to the end of optical fiber 20. Glass bead 30 is preferably formed according to a process best illustrated in FIGS. 3–7. An apparatus 50 for forming glass bead 30 is schematically illustrated in FIG. 3. Apparatus 50 is generally comprised of a stationary locating fixture 52 dimensioned to receive an end of fiber 20. Fixture 52 is generally comprised of a metal or ceramic tube 54 dimensioned to receive fiber 20 therethrough. A mechanical stop 56 is positioned relative to fixture 52 such that a predetermined length of fiber 20, designated 20a, extends beyond the end of tube 54. According to a preferred embodiment of the present invention, a heat source is provided to heat portion 20a of fiber 20 extending beyond protective tube 54 to burn away protective sheath 24 from glass fiber 22 and to form glass bead 30 thereon. In the embodiment shown, the heat source is a gas burner 60 having a flame designated 62. Burner 60 is movable along a path, designated P in the drawings, that intersects with the exposed portion 20a of fiber 20. Burner 60 is positioned relative to the exposed portion 20a such that flame 62 from burner 60 intersects the free end thereof wherein the free end is positioned approximately in the center of flame 62, as best seen in FIG. 4. FIG. 4 illustrates when portion 20a of fiber 20 (with protective sheath 24 still thereon) first contacts flame 62. Stop 56 is preferably movable with burner 60 to move away from the end of fiber 20 when flame 62 moves theretoward. Flame 62 preferably has a gas pressure and temperature such that the following occurs. As flame 62 is brought into alignment with fiber 20, protective sheath 24, which is formed of a polymeric material, is burned away from glass fiber 22, as shown in FIGS. 5, 6 and 7, wherein glass fiber 22 is shown as a solid line. In this respect, the glass fiber 22, i.e., glass core 26 and cladding 28, remain. Importantly, tube 54 acts to protect fiber 20 and to limit the amount of sheath 24 burned away by flame 62.

Because the hottest part of flame 62 is located near the edge thereof, glass fiber 22 softens at this point first. As a result of the gas pressure generated by the combustible gas, a portion of the exposed glass fiber 20a is bent upward as shown in FIG. 5. Continued exposure to flame 62 causes this bent-up portion to begin to soften and slide downward upon itself forming, generally, a bead of glass 30, as illustrated in FIGS. 6 and 7. After glass bead 30 is formed, flame 62 is moved away from fiber 20, wherein bead 30 is allowed to solidify and harden. With burner 60 operating at an oxygen ($O_2$) flow rate of about 100 cc/min and a hydrogen ($H_2$) flow rate of about 200 cc/min, a five second exposure of flame 62 to the end of fiber 20 is sufficient to create glass bead 30.

Figure 2:
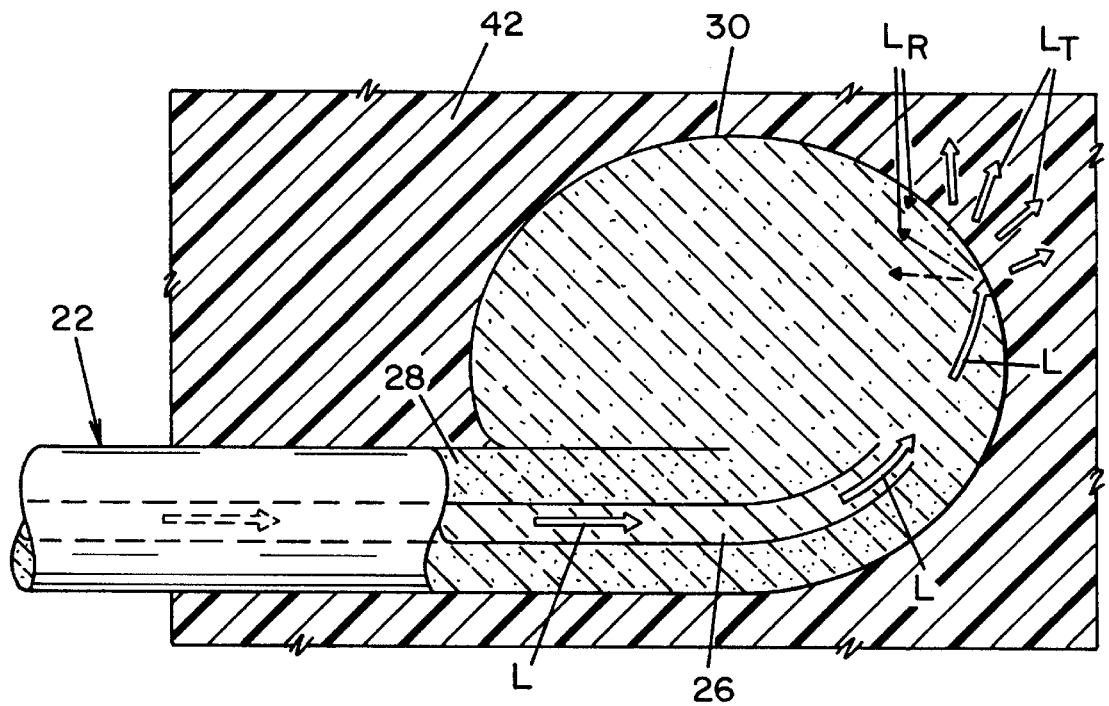
FIG. 2 is an enlarged view of the end of an optical fiber as formed in accordance with the present invention.

A glass bead 30 formed according to the foregoing process is best seen in FIG. 2. As shown in FIG. 2, bead 30 is not formed symmetrically with respect to the axis of fiber 20. In other words, glass bead 30 is generally asymmetrical relative to the axis of fiber 20. In this respect, bead 30 is formed by molten glass basically sliding down onto and coming to rest generally along the upper side of fiber 20 to produce a "club-shaped" structure. As will be appreciated, bead 30 is comprised of a molten mass of the glass that is formed of cladding 28 and core 26. On information and belief, it is believed that the core and cladding interface remains intact within a portion of bead 30. In other words, as best illustrated in FIG. 2, core 26 and cladding 28 include a curved portion that bends toward bead 30.

Referring now to protective structure 40, light transmitting material 42 is provided to surround glass bead 30 and to provide a medium to transmit light away from glass bead 30. To this end, material 42 preferably has an index of refraction approximately equal to the index of refraction of the glass forming glass bead 30. As used herein, "approximately equal to" refers to a material that may have an index of refraction slightly greater or slightly less than the index of refraction of glass bead 30.

Material 42 may be a fluid, a gel or a solid and provides the necessary light transmitting characteristics, but in accordance with a preferred embodiment, is a solid to provide structural protection to glass bead 30 and to fix glass bead 30 within housing 44. Material 42 may be a clear thermoplastic, such as, by way of example, polystyrene, an acrylic such as polymethylmethacrylate, or polymethacrylate, or may be a clear thermoset, such as, by way of example, an epoxy or a urethane. Material 42 may also be a glass having a softening point lower than the glass forming bead 30.

Housing 44 is provided to contain material 42 and to protect the fiber end. In the embodiment shown, housing 44 is tubular and has a cylindrical cross-section. As will be appreciated from a further reading of the specification, housing 44 may have other than a cylindrical cross-section, such as a rectangular cross-section or other prismatic cross-sectional shape. In addition, housing 44 need not be completely tubular, but may be channel-shaped in cross-section. In accordance with the present invention, housing 44 is formed of a light transmitting, solid material. Housing 44 may be formed of a glass, a thermoset or a thermoplastic. Light absorbing material 46 is provided to completely enclose and encase housing 44. Material 46 is preferably formed of a material capable of absorbing a majority of light incident thereon. Material 46 may be a thermoplastic, or a thermoset.

Referring now to a preferred embodiment of the present invention, housing 44 is a cylindrical tube having an inner cavity dimensioned to receive fiber 20 and bead 30. Housing 44 is preferably formed of a quartz glass having an index of refraction approximately equal to the index of refraction of glass bead 30. In the embodiment shown, housing 44 is a cylindrical glass tube (approximately 1 cm long, 2 mm OD and 0.6 mm ID).

In a preferred embodiment, material 42 is a clear ultraviolet (UV) curing epoxy, such as UV121 epoxy having an index of refraction approximately equal to the index of refraction of glass bead 30. In the assembly of termination device 10, housing 44 is first filled with the curable epoxy material. Because of its relatively small size, housing 44 is preferably filled with the epoxy by means of a capillary action. The free end of fiber 20 is inserted into the epoxy-filled housing 44. The epoxy is then cured to lock the end of fiber 20 within housing 44. In the embodiment shown, the UV 121 epoxy is cured for about 90 seconds using a EFOS Ultracure 100 SS UV light source.

The final step in the fabrication of termination device 10 comprises coating housing 44 and a portion of the fiber extending therefrom in material 46. According to a preferred embodiment, housing 44 and fiber 20 are dipped into black Plastidip®, which is a registered trademark of PDI Inc., that is a black, air-dryable polymeric material. As best seen in FIG. 1, material 46 forms a fillet 46a at the junction where fiber 20 meets material 42. It has been found that this fillet 46a beneficially acts as a strain relief supporting fiber 20.

The present invention thus provides a termination device for optical fibers. A termination device 10 formed according to the foregoing provides a simple, yet effective, device for reducing deleterious reflection of light in optic fibers. In this respect, a conventional standard for fiber optic terminators was established by BELLCORE (see generic requirements for fiber optic terminators GR-1222-CORE). The most stringent BELLCORE specification (−65 dB) is exceeded by termination device 10 formed according to the present invention.

Figure 8:
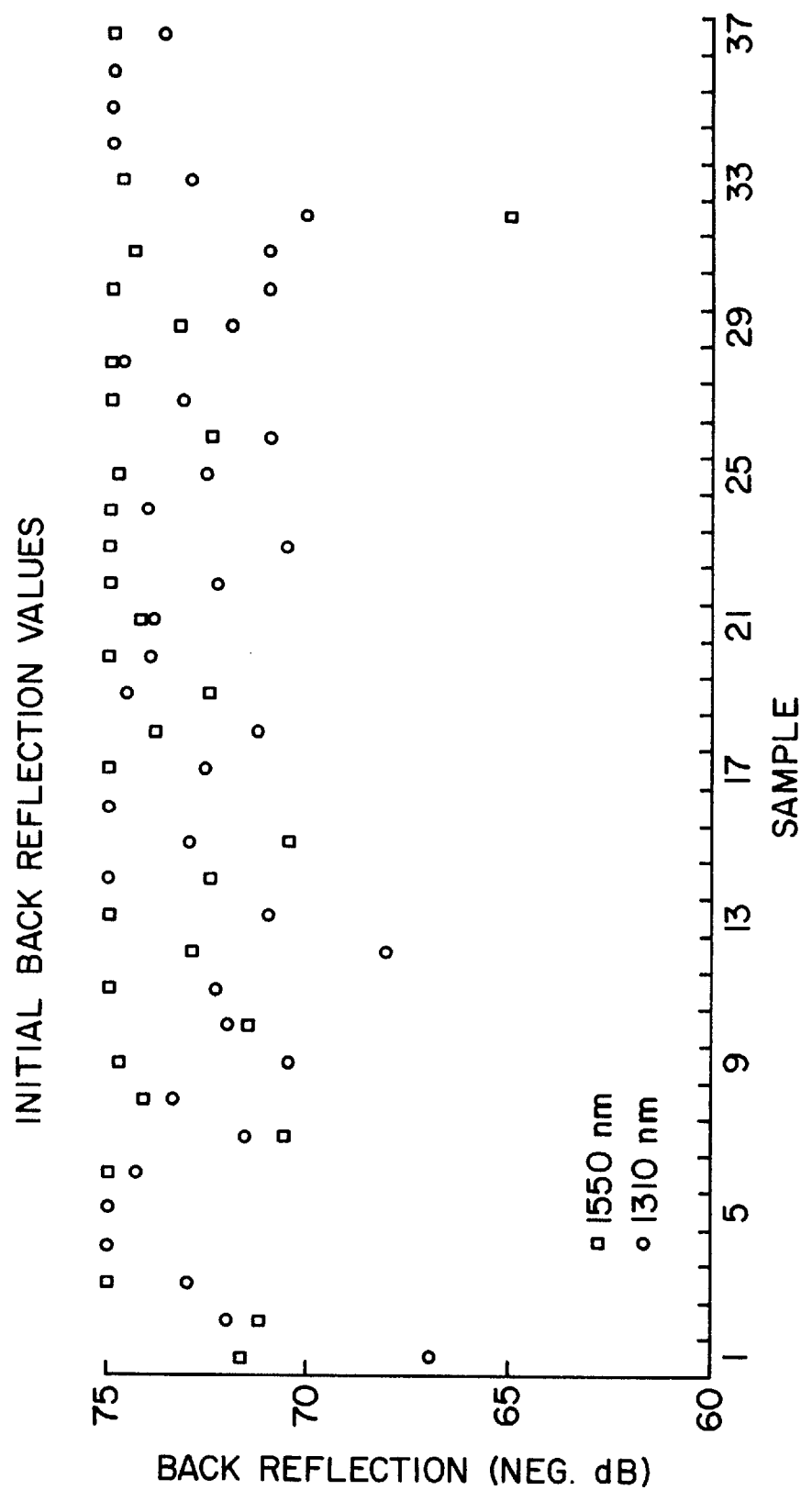
FIG. 8 is a graph illustrating the reflection characteristics of termination devices formed according to the present invention for light waves of 1310 nm and 1550 nm.

FIG. 8 shows initial back reflection values for approximately 37 termination devices formed in accordance with the present invention tested at both 1310 nm and 1550 nm wavelengths. The chart shows that the vast majority of samples exceeded 70 decibels. A large number of the tested termination devices met or exceeded 75 dB, 75 decibels being the testing limit of the equipment used. Using equation 1, this corresponds to a reflected power of $3 \times 10^{-6}$ percent of the incident power. In this respect, as will be appreciated, because the decibel plot is logarithmic, each increase per decibel reading represents a significant reduction in reflected light. Moreover, all of the tested samples, even sample 32 which represented the worst performance, exceeded the most stringent 65 decibel BELLCORE standard.

FIG. 9 is a graph showing the average reflection in decibels (dB) for termination devices according to the present invention at various temperatures and for wavelengths of 1310 nm and 1550 nm. As shown in FIG. 9, the average back reflection exceeded 68 dB for both wavelengths for temperatures of −40° C. to 85° C. This corresponds to a reflection of only about $1.6 \times 10^{-5}$ percent of the incident power. This may be determined by the following equation:

$$dB = -10 \log(P_r/P_i); \quad (1)$$

where $P_r$ is the reflected power, $P_i$ is the incident power and the dB value is positive.

It is believed that the foregoing performance is the result of any light introduced into the end of the fiber being transmitted outwardly from the fiber to the light absorbing coating. Specifically, it is believed that any light traveling down fiber 20 is bent by the curved end of the fiber into glass bead 30, as illustrated by arrows "L" in FIG. 2. Light transmitted into glass bead 30 will travel to the interface defined by glass bead 30 and material 42. Depending upon the index of refraction of the respective components, one of the following three interface configurations may exist: 1) the index of refraction of glass bead 30 and material 42 may be equal; 2) the index of refraction of glass bead 30 may be less than the index of refraction of material 42; or 3) the index of refraction of glass bead 30 is greater than the index of refraction of material 42.

In the first possible interface configuration, i.e., where the index of refraction of glass bead 30 and material 42 are equal, there is no index mismatch at the interface, and therefore, all light incident on the interface is transmitted into material 42.

In the second possible interface configuration, i.e., where the index of refraction of glass bead 30 is less than the index of refraction of light transmitting material 42, the majority of light incident upon the interface of glass bead 30 and material 42 would be transmitted into material 42, as schematically illustrated in FIG. 2 by arrow designated "$L_r$" in FIG. 2, and some light would be reflected back into glass bead 30, as designated by arrow "$L_R$." In this respect, whenever transmission occurs, a small percentage of the incident light is reflected, if there is a difference in the index of refraction of the two materials. The reflected light continues within glass bead 30 until its incident at the interface of glass bead 30 and material 42 results in further transmission of light into material 42. Again, a small percentage of the incident light would be reflected into glass bead 30. This process continues until the majority of light energy is transmitted from glass bead 30 into light transmitting material 42.

In the third possible interface configuration, i.e., wherein the index of refraction of glass bead 30 is greater than the index of refraction of material 42, light incident on the interface may either be totally internally reflected (if the angle of incidence is greater than the "critical angle") or be partially transmitted and partially reflected (if the angle of incidence is less than the critical angle). In this respect, light entering glass bead 30 through optical fiber 12 would strike the side of glass bead 30 at a specific angle ∝ measured from the normal at the point of incidence. If the index of refraction of light transmitting material 42 is less than the index of refraction of glass bead 30, and if ∝ is greater than the critical angle, the incident light will be totally internally reflected within glass bead 30. The light would be maintained within glass bead 30 until the angle of incidence is less than the critical angle. The generally rounded shape of glass bead 30 increases the likelihood that the internal light will eventually strike the interface between glass bead 30 and material 42 at an angle less than ∝ wherein the majority of the incident light therein will be transmitted away from glass bead 30.

A similar analysis generally pertains to light incident on the interface defined between light transmitting material 42 and light transmitting housing 44. Depending upon the "interface configuration" existing between material 42 and housing 44, the same analyses set forth above will apply. Eventually, the majority of light will be transferred from light transmitting material 42 into housing 44. From housing 44, the light eventually encounters the interface with the outer coating which absorbs the light. It will, of course, be appreciated that at each interface some light is reflected back toward glass bead 30. However, the intensity level of such light is so small as to be inconsequential as is evidenced by the attenuation levels attained by the present invention. This dynamic process basically continues until the vast majority of original light is transmitted into the light absorbing material 46 surrounding housing 44. On information and belief, the vast majority of light which engages light absorbing material 46 is absorbed and does not re-enter housing 44, light transmitting material 42 or glass bead 30.

Thus, while it is preferable that the index of refraction of the light transmitting material is approximately equal to the index of refraction of glass bead 30, it is believed that the present invention would find advantageous application in reducing reflected light, even if the index of refraction of light transmitting material 42 is less than or approximately equal to the index of refraction of glass bead 30. Accordingly, in the context of the embodiment shown, the type of material 42 used within housing 44 is not critical as long as it is clear and reasonably close to the index refraction of glass fiber 20 and glass housing 44.

Further with respect to the embodiment shown, the dimensions of housing 44 as set forth above were chosen to give a convenient final package size with reasonable strength. It is believed that the inner diameter of housing 44 should be sufficient to make it easy to insert fiber 20 and bead 30 therein. Moreover, the light absorbing material coating housing 44 may have a color other than black, and may be comprised of an acrylic paint-like material.

In an alternate embodiment of the present invention, material 42 is a light absorbing material wherein light emanating from glass bead 30 is absorbed directly by material 42. In this embodiment, housing 44 may be formed of a metallic material, or any other material, sufficient to provide physical protection to glass bead 30, and material 46, may be provided, if necessary, to protect the housing from corrosive environmental conditions. In this embodiment, material 42 prevents reflection of light back into glass bead 30 by absorbing the light emanating therefrom, wherein housing 44 and coating 46 provide the physical protection to the fiber end.

In this respect, it has been found that the low reflection properties obtained by the present invention are obtained primarily by the formation of glass bead 30 at the end of glass fiber 22. Glass bead 30 is preferably surrounded by a structure that protects glass bead 30, but that also absorbs light or transmits light away from glass bead 30.

The invention has been described with respect to a preferred embodiment, modifications and alterations of which will occur to others upon their reading and understanding of the specification. For example, Still further, while the preferred method of forming glass bead 30 is by means of a gas burner as described above, a laser or an electric arc may also be used, for example, by inclining glass fiber 20 and using a moving laser, glass softened by the laser may be controlled to run down the inclined fiber to form a bead. It is intended that all such alterations and modifications be included insofar as they come within the scope of the patent as claimed or the equivalents thereof.

Having described the invention, the following is claimed:

1. A method for terminating an end of an optical fiber, comprising the steps of:
   heating an end of an optical fiber until said end softens and forms a bead of glass thereon;
   inserting said end of said fiber into a tube filled with a curable epoxy; and
   curing said epoxy to fix said end within said tube.

2. A method as defined in claim 1, wherein said epoxy is a clear UV curable epoxy.

3. A method as defined in claim 2, wherein said UV curing epoxy has an index of refraction approximately equal to the index of refraction of said bead of glass.

4. A method as defined in claim 3, wherein said tube is glass and has an index of refraction approximately equal to the index of refraction of said bead of glass.

5. A method as defined in claim 4, further comprising the step of coating said tube with a light absorbing material.

6. A method as defined in claim 5, wherein said light absorbing material is a polymeric coating.

7. A method as defined in claim 6, wherein said polymeric coating is black.

8. A method as defined in claim 1, wherein said heating of said end includes:
   allowing a predetermined length of said end of said optical fiber to be exposed to a flame; and,
   allowing said predetermined length of said end of said optical fiber to be exposed to said flame until a protective coating burns away from a portion of said glass fiber, and said glass fiber softens, and bends upward and forms a glass bead at the end of said optical fiber.

9. A low reflection termination device, comprising:
   a tubular glass housing having an interior cavity;
   an optical fiber having an end, a portion of said end being formed by the application of heat into a glass bead, said glass bead having an index of refraction, said optical fiber extending into said glass housing with said glass bead positioned within said interior cavity;
   a clear cured epoxy disposed within said cavity of said housing, said epoxy surrounding said glass bead; and
   a light absorbing material coating said tubular glass housing.

10. A termination device as defined in claim 9, wherein said glass housing has an index of refraction approximately equal to the index of refraction of said glass bead.

11. A termination device as defined in claim 9, wherein said epoxy has an index of refraction approximately equal to the index of refraction of said glass bead.

12. A termination device as defined in claim 11, wherein said epoxy is ultraviolet (UV) light curing.

13. A termination device as defined in claim 9, wherein said glass bead is formed by exposing a portion of said end of said optical fiber to a heat source until a protective coating on said optical fiber burns away and said portion of said end softens to a glass bead.

14. A termination device as defined in claim 13, wherein glass bead is asymmetrical to the axis of said optical fiber.

15. A termination device as defined in claim 13, wherein said heat source is a gas flame.

16. A termination device as defined in claim 9, wherein said light absorbing material is polymeric material.

17. A termination device as defined in claim 16, wherein said polymeric material is black.

18. A method for terminating an end of an optical fiber, comprising the steps of:
   heating an end of an optical fiber to form a bead of glass thereon; and
   encasing said end of said fiber in a housing containing a non-reflective material.

19. A method as defined in claim 18, wherein said material within said housing has an index of refraction approximately equal to the index of refraction of said bead of glass, and said housing is a glass tube that has an index of refraction approximately equal to the index of refraction of said bead of glass.

20. A method as defined in claim 19, wherein said light transmitting material is a solid.

21. A method as defined in claim 20, wherein said light transmitting material is a cured epoxy.

22. A method as defined in claim 19, wherein said light transmitting material has an index of refraction greater than the index of refraction of said bead of glass.

23. A low reflection termination device, comprising:
   a housing having a cavity therein;
   an optical fiber having an end thereof formed into a bead of glass by the application of heat, said optical fiber extending into said housing with said bead of glass positioned within said cavity; and
   a non-reflective material within said cavity of said housing surrounding said bead of glass.

24. A termination device as defined in claim 23, wherein said housing is a glass tube that has an index of refraction approximately equal to the index of refraction of said bead of glass and said material within said housing is light transmitting.

25. A termination device as defined in claim 24, wherein said light transmitting material is a solid.

26. A termination device as defined in claim 25, wherein said light transmitting material is a cured epoxy.

27. A termination device as defined in claim 26, wherein said epoxy is ultraviolet (UV) light curing.

28. A termination device as defined in claim 23, wherein said bead of glass is asymmetrical to the axis of said optical fiber.

29. A method of terminating an end of an optical fiber, comprising the steps of:

exposing an end of a glass fiber of an optical fiber to a heat source for a predetermined period of time until said end softens and flows into a bead of glass at said end of said optical fiber;

surrounding said bead of glass and a portion of said optical fiber with a non-reflective material; and encasing said non-reflective material in a rigid protective housing.

30. A method as defined in claim 29, wherein said non-reflective material is a light transmitting material.

31. A method as defined in claim 29, wherein said non-reflective material is a light absorbing material.

32. A method as defined in claim 29, wherein said glass fiber includes a protective coating and said heat source burns away said protective coating.

33. A method of forming an optical device, comprising the steps of:

positioning an optical fiber having an inner glass fiber and a protective coating thereon in a fixture wherein a portion of said optical fiber is exposed;

exposing said portion of said optical fiber to a heat source; and maintaining said portion of said optical fiber exposed to said heat until said protective coating is removed.

34. A method as defined in claim 33, wherein said portion of said optical fiber is exposed to said heat until said glass fiber is softened and forms a glass bead at the end thereof.

* * * * *